United States Patent
Liu et al.

(10) Patent No.: US 12,078,597 B2
(45) Date of Patent: Sep. 3, 2024

(54) FRAMEWORK FOR IMAGE BASED UNSUPERVISED CELL CLUSTERING AND SORTING

(71) Applicants: SONY GROUP CORPORATION, Tokyo (JP); Sony Corporation of America, New York, NY (US)

(72) Inventors: Ming-Chang Liu, San Jose, CA (US); Su-Hui Chiang, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 703 days.

(21) Appl. No.: 17/222,131

(22) Filed: Apr. 5, 2021

(65) Prior Publication Data
US 2022/0155232 A1 May 19, 2022

Related U.S. Application Data
(60) Provisional application No. 63/116,065, filed on Nov. 19, 2020.

(51) Int. Cl.
| | |
|---|---|
| G01N 21/64 | (2006.01) |
| G06F 18/214 | (2023.01) |
| G06F 18/231 | (2023.01) |
| G06N 3/04 | (2023.01) |
| G06T 7/00 | (2017.01) |
| G06V 10/44 | (2022.01) |

(52) U.S. Cl.
CPC ..... *G01N 21/6486* (2013.01); *G01N 21/6458* (2013.01); *G06F 18/214* (2023.01); *G06F 18/231* (2023.01); *G06N 3/04* (2013.01); *G06T 7/0012* (2013.01); *G06V 10/44* (2022.01); *G06T 2207/20081* (2013.01); *G06T 2207/20084* (2013.01); *G06T 2207/30024* (2013.01)

(58) Field of Classification Search
CPC . G01N 21/6458; G06F 18/214; G06F 18/231; G06T 7/0012; G06T 2207/20081; G06T 2207/20084; G06T 2207/30024; G06V 10/44
See application file for complete search history.

(56) References Cited

U.S. PATENT DOCUMENTS
10,426,442 B1 * 10/2019 Schnorr ............... A61B 8/5223

FOREIGN PATENT DOCUMENTS
| | | |
|---|---|---|
| JP | 2017515189 A | 6/2017 |
| WO | WO-2008129881 A1 | 10/2008 |
| WO | WO-2020004101 A1 | 1/2020 |

\* cited by examiner

*Primary Examiner* — Diane D Mizrahi
(74) *Attorney, Agent, or Firm* — Haverstock & Owens, A Law Corporation

(57) ABSTRACT

A framework that includes a feature extractor and a cluster component for clustering is described herein. The framework supports (1) offline image-based unsupervised clustering that replaces time-consuming manual gating; (2) online image-based single cell sorting. During training, one or multiple cell image datasets with or without ground truth are used to train feature extractor, which is based on a neural network including several convolutional layers. Once trained, the feature extractor is used to extract features of cell images for unsupervised cell clustering and sorting. In addition, additional datasets may be used to further refine the feature extractor after it has been trained.

15 Claims, 6 Drawing Sheets

FRAMEWORK FOR IMAGE BASED UNSUPERVISED CELL CLUSTERING AND SORTING

CROSS-REFERENCE TO RELATED APPLICATION(S)

This application claims priority under 35 U.S.C. § 119(e) of the U.S. Provisional Patent Application Ser. No. 63/116,065, filed Nov. 19, 2020 and titled, "UNSUPERVISED LEARNING FRAMEWORK FOR IMAGE BASED SINGLE CELL SORTING," which is hereby incorporated by reference in its entirety for all purposes.

FIELD OF THE INVENTION

The present invention relates to cell sorting. More specifically, the present invention relates to image based cell sorting.

BACKGROUND OF THE INVENTION

Traditional fluorescence activated cell sorting relies on labeling cells with fluorescent markers and has very limited morphological information of cells. However, some applications require morphological information of cells to accurately sort the cells, while some applications are not suitable to use fluorescent markers. In addition, traditional fluorescence activated cell sorting (FACS) uses manual gating to establish sorting criteria based on fluorescent markers. However, manual gating is time consuming and may be biased.

Some studies proposed image based cell sorting using supervised learning based on deep neural networks or hand crafted features. They assumed cell images with ground truth for training, which may not be available. Some software that helps the gating process rely on particular hand-crafted features of fluorescent markers, which may not have sufficient morphological information for some applications or may not be suitable for some other applications.

SUMMARY OF THE INVENTION

A framework that includes a feature extractor and a cluster component for clustering is described herein. The framework supports (1) offline image-based unsupervised clustering that replaces time-consuming manual gating; (2) online image-based single cell sorting. During training, one or multiple cell image datasets with or without ground truth are used to train feature extractor, which is based on a neural network including several convolutional layers. Once trained, the feature extractor is used to extract features of cell images for unsupervised cell clustering and sorting. In addition, additional datasets may be used to further refine the feature extractor after it has been trained.

In one aspect, a method comprises performing offline initial image-based unsupervised clustering and performing online image-based single cell sorting. The method further comprises training which comprises receiving one or more cell image datasets with or without ground truth information to train a feature extractor. The feature extractor is based on a neural network comprising several convolutional layers. Performing offline initial clustering for a set of cell images includes using the feature extractor to extract features of the cell images, using a small subset of the given cell images to train the cluster component, and using the cluster component to identify the clusters of the given cell images in an unsupervised manner. Performing online image-based single cell sorting includes utilizing the feature extractor to extract features of cell images and using the cluster component for unsupervised cell sorting. The method further comprises refining the feature extractor using additional datasets after the feature extractor has been trained. Clustering may utilize hierarchical density-based spatial clustering or other clustering algorithms. Clustering separates and groups different types of cells based on the extracted features including a definition of each cluster.

In another aspect, an apparatus comprises a non-transitory memory for storing an application, the application for: performing offline initial image-based unsupervised clustering; and performing online image-based single cell sorting and a plurality of processing units configured for processing the application, wherein the plurality of processing units include at least one central processing unit and at least one graphics processing unit. The application is further for training which comprises receiving one or more cell image datasets with or without ground truth information to train a feature extractor. The feature extractor is based on a neural network comprising several convolutional layers. Performing offline initial clustering for a set of cell images includes using the feature extractor to extract features of the cell images, using a small subset of the given cell images to train the cluster component, and using the cluster component to identify the clusters of the given cell images in an unsupervised manner. Performing online image-based single cell sorting includes utilizing the feature extractor to extract features of cell images and using the cluster component for unsupervised cell sorting. The application is further for refining the feature extractor using additional datasets after the feature extractor has been trained. Clustering may utilize hierarchical density-based spatial clustering or other clustering algorithms. Clustering separates and groups different types of cells based on the extracted features including a definition of each cluster.

In another aspect, a system comprises a first computing device configured for: performing offline image-based unsupervised clustering and performing online image-based single cell sorting based on the offline image-based unsupervised clustering and a second computing device configured for sending one or more images to the first computing device. The first device is configured for training which comprises receiving one or more cell image datasets with or without ground truth information to train a feature extractor. The feature extractor is based on a neural network comprising several convolutional layers. Performing offline initial clustering for a set of cell images includes using the feature extractor to extract features of the cell images, using a small subset of the given cell images to train the cluster component, and using the cluster component to identify the clusters of the given cell images in an unsupervised manner. Performing online image-based single cell sorting includes utilizing the feature extractor to extract features of cell images and using the cluster component for unsupervised cell sorting. The first device is further for refining the feature extractor using additional datasets after the feature extractor has been trained. Clustering may utilize hierarchical density-based spatial clustering or other clustering algorithms. Clustering separates and groups different types of cells based on the extracted features including a definition of each cluster.

DETAILED DESCRIPTION OF THE PREFERRED EMBODIMENT

The method and system described herein includes a learning framework that supports (1) offline image-based unsupervised clustering that replaces time-consuming manual gating and (2) online image-based single cell sorting. This framework includes feature extraction and clustering. During training, one or multiple cell image datasets with or without ground truths are used to train a feature extractor, which is based on a neural network including several convolutional layers. Once trained, the feature extractor is used to extract features of cell images for unsupervised cell clustering and sorting. Also, additional datasets may be used to further refine the feature extractor after the feature extractor has been trained. The method and system described herein are the first to combine neural network-based feature extraction and clustering in an unsupervised learning framework for image-based offline cell clustering and online single cell sorting. As a tool for offline initial clustering, this replaces time-consuming manual gating in conventional FACS workflow. As a tool for online single cell sorting, this improves or enables applications that cannot be done accurately without cell morphological information.

Traditional Fluorescence Activated Cell Sorting (FACS) relies on labeling cells with fluorescent markers, which have very limited morphological information of cells. However, some applications require morphological information of cells to accurately sort the cells, while some applications are not suitable for fluorescent markers. The method and system described herein implement a framework that allows applications to cluster and sort cells based on cell images with or without fluorescent markers. Some studies proposed image based cell sorting using supervised learning based on deep neural networks or hand crafted features. They assumed cell images with ground truth for training, which may not be available. The method and system described herein implement a framework that allows training with or without ground truth.

Manual gating in traditional FACS is time consuming and may be biased. There is software that helps with the process but relies on particular hand-crafted features, which may not provide sufficient information as images themselves. The method and system described herein take advantage of images and deep learning for better performance.

A framework that includes a feature extractor and a cluster component for clustering is described herein. The framework supports offline image-based unsupervised clustering that replaces time-consuming manual gating and online image-based single cell sorting.

Figure 1:
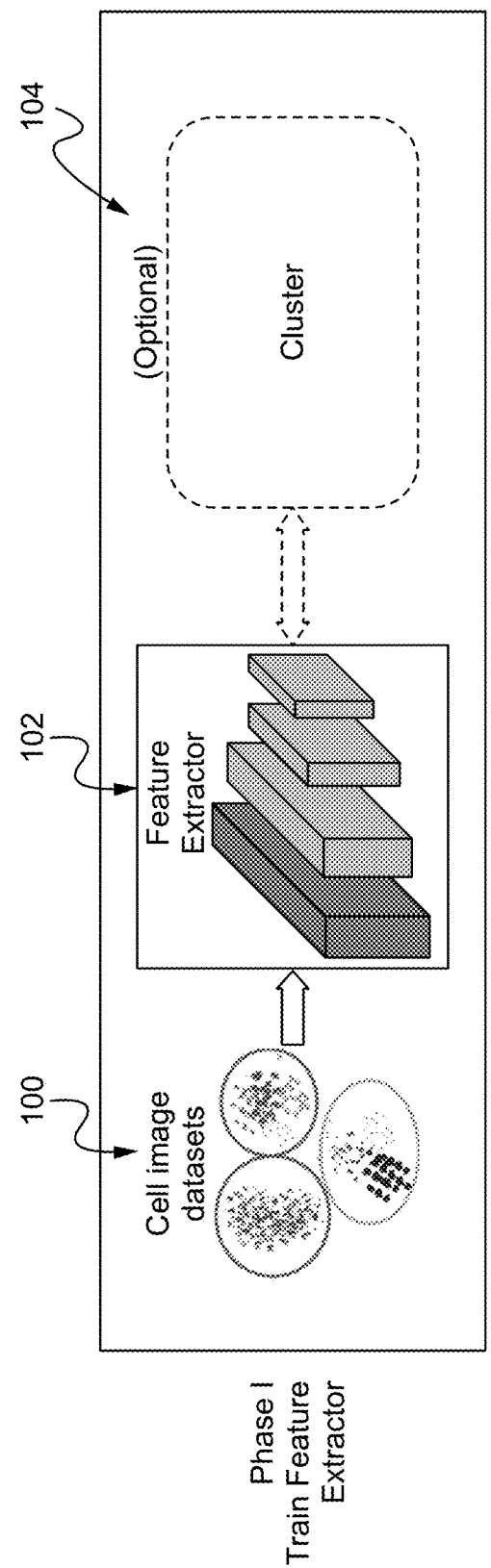
FIG. 1 illustrates a flowchart of a method of training a feature extractor according to some embodiments.

FIG. 1 illustrates a flowchart of a method of training a feature extractor according to some embodiments. In the step 100, cell image datasets are received. In some embodiments, datasets with or without ground truth information are received. In some embodiments, the dataset includes images and/or videos. The dataset is able to include information acquired using a certain imaging system (e.g., one or more cameras) and processed using one or more image/video processing algorithms. In some embodiments, the imaging system is part of the flow cytometer or other viewers for viewing and capturing images of cells. The dataset is able to be sent to and stored in a server and then received at (e.g., downloaded to) a computing device implementing the training method. The training is able to be performed without supervision.

In the step 102, a feature extractor is implemented. A feature extractor is used for extracting features from an image. The feature extractor is based on a neural network. In some embodiments, the feature extractor uses several convolutional layers, followed by pooling layers. To train a feature extractor, an exemplary approach is to use contrastive loss which includes contrasting each sample to a set of positive and negative samples for computing loss. Additional datasets may be used to further refine the feature extractor after the feature extractor has been trained.

In the step 104, a feedback from clustering is performed. In some embodiments, the feedback clustering is optional. In some embodiments, the cluster optionally provides feedback for training the feature extractor. Clustering may utilize hierarchical density-based clustering or other clustering algorithms. Clustering separates and groups different types of cells based on the extracted features. Hierarchical Density-Based Spatial Clustering (HDBSCAN) is an exemplary clustering algorithm that is able to handle an unknown number of classes. HDBSCAN performs density-based clustering with noise over epsilon values and integrates the result to find stable clustering. Given a set of points in some space, HDBSCAN groups together points that are closely packed together (e.g., a point with many nearby neighbors). Although HDBSCAN is described herein, any clustering algorithm is able to be utilized.

Figure 2:
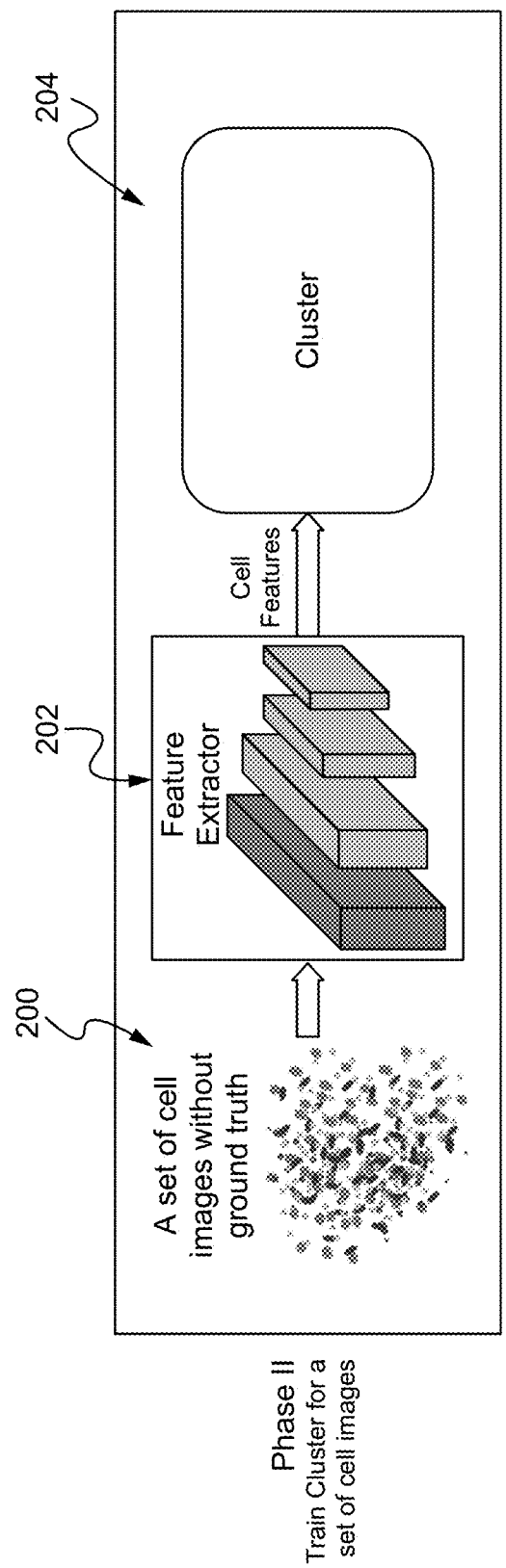
FIG. 2 illustrates a flowchart of a method of training the cluster component for a set of cell images according to some embodiments.

FIG. 2 illustrates a flowchart of a method of training the cluster component for a set of cell images according to some embodiments. In some embodiments, the phase II trains the Cluster component before the Cluster component can be used in offline initial clustering (phase III) or online single cell sorting (phase IV).

In some embodiments, phase III can be also used to train the Clustering component as part of the offline initial clustering. In such cases, phase II is not used, and the Cluster component trained in phase III is used for online single cell sorting (phase IV). Furthering the example, offline initial clustering is performed, and the Cluster component is trained at the same time. A user may pick a subset of clusters for further analysis, and the Cluster component trained can then be used for online single cell sorting in phase IV.

In the step 200, a small set of cell images without ground truth information is acquired. In some embodiments, the set of cell images includes images and/or videos. The set of cell images is able to include information acquired using the imaging system and processed using one or more image/video processing algorithms. In some embodiments, the imaging system is part of the flow cytometer or other viewers for viewing and capturing images of cells.

In the step 202, a feature extractor trained in the step 102 is used to extract cell features from a small set of cell images.

In the step 204, the Cluster component is trained using the given set of cell images. An example algorithm for Cluster is HDBSCAN (Hierarchical Density-Based Spatial Clustering of Applications with Noise), which has an advantage of handling unknown number of clusters and allows noises in the input.

Figure 3:
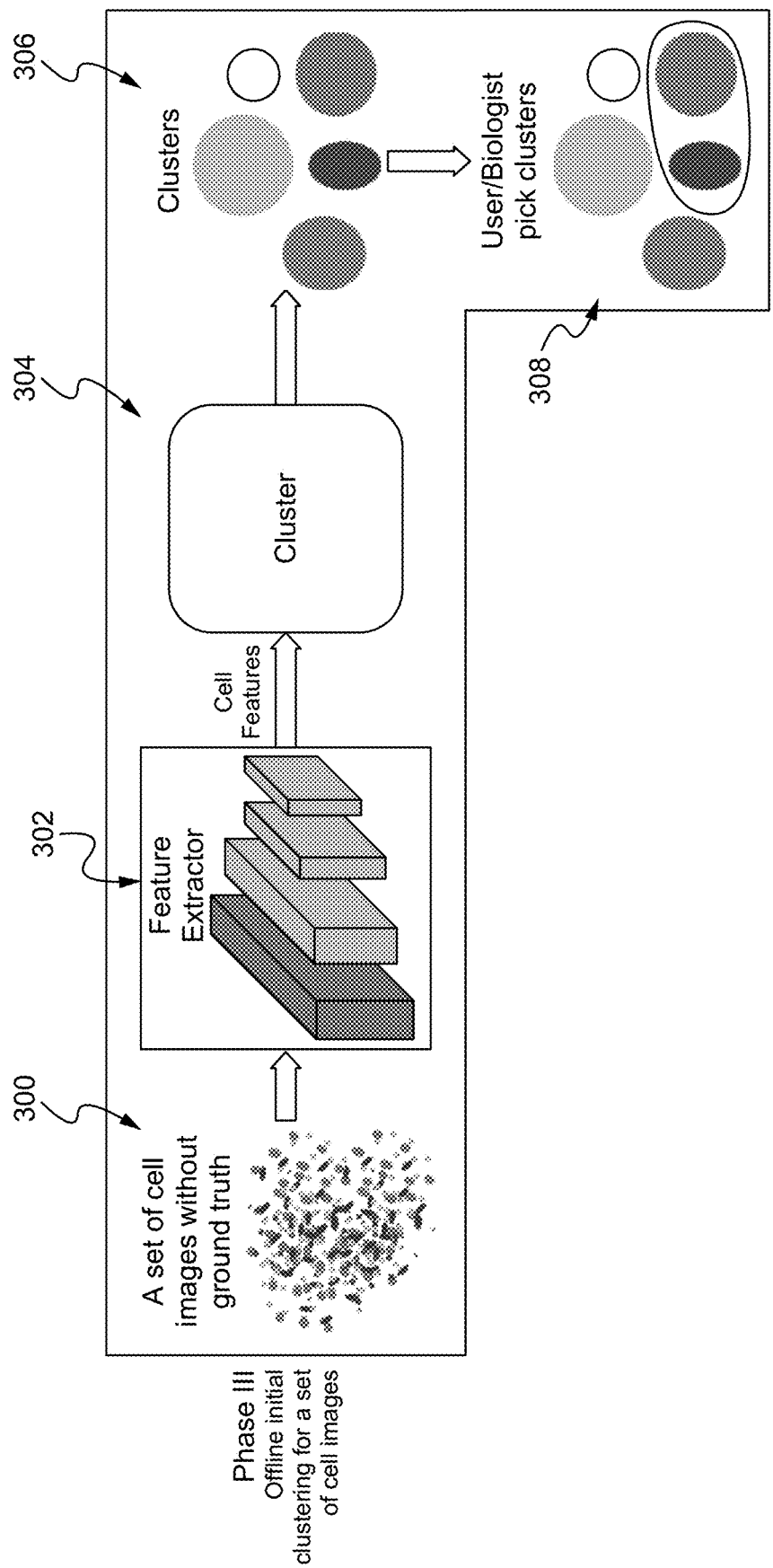
FIG. 3 illustrates a flowchart of a method of offline initial clustering for a set of cell images according to some embodiments.

FIG. 3 illustrates a flowchart of a method of offline initial clustering for a set of cell images according to some embodiments. This can be used to replace time-consuming manual gating in traditional FACS. The steps 300, 302 and 304, correspond to the steps 200, 202 and 204, respectively. In the step 306, the Cluster trained in the step 204 identifies the clusters for all cells. In the step 308, a user may pick a subset of clusters of interest for further analysis.

Figure 4:
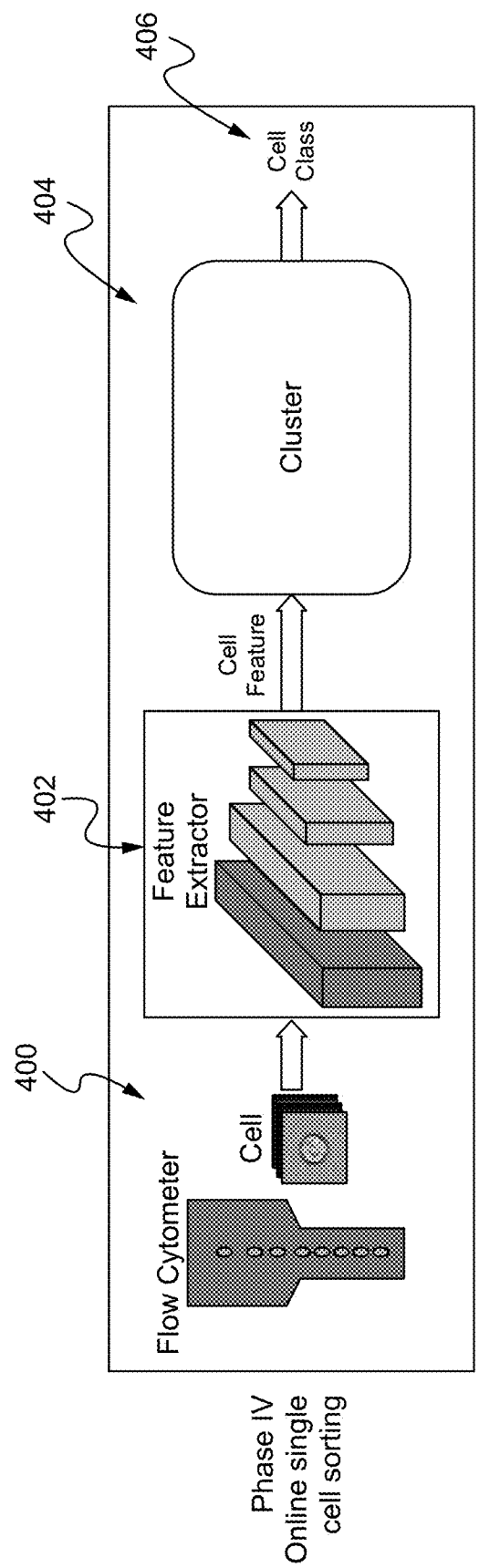
FIG. 4 illustrates a flowchart of a method of online single cell sorting according to some embodiments.

FIG. 4 illustrates a flowchart of a method of online single cell sorting according to some embodiments. The step 400 shows a flow cytometer. Flow cytometry is a technique used to detect and measure physical and chemical characteristics of a population of cells or particles. Then in the process, a sample containing cells or particles is suspended in a fluid and injected into the flow cytometer instrument.

In the step 402, the trained feature extractor (e.g., trained in the step 102) extracts cell features from each cell image, which may contain one or multiple channels of images (e.g., bright field, dark field, and others).

In the step 404, the Cluster component trained in step 204 is used for online sorting by classifying cell features of each cell into cell class, in the step 406. For online cell sorting, the implementation works for an unknown number of clusters and allows noise, and works even when ground truth is not available.

Cell sorting involves taking cells from an organism and separating them according to their type. In image-based cell sorting, the cells are able to be separated based on extracted features of cell images. The real-time sorting is able to utilize the definitions of the clusters. For example, the system compares features/components of a cell and determines which cluster the cell matches most closely.

Although phase I through phase IV are described herein, in some embodiments, phase II is able to be combined with phase III. In some embodiments, the order of the steps is important, such as performing phase I before any other phase, or performing phase IV only after phases I-III.

Figure 5:
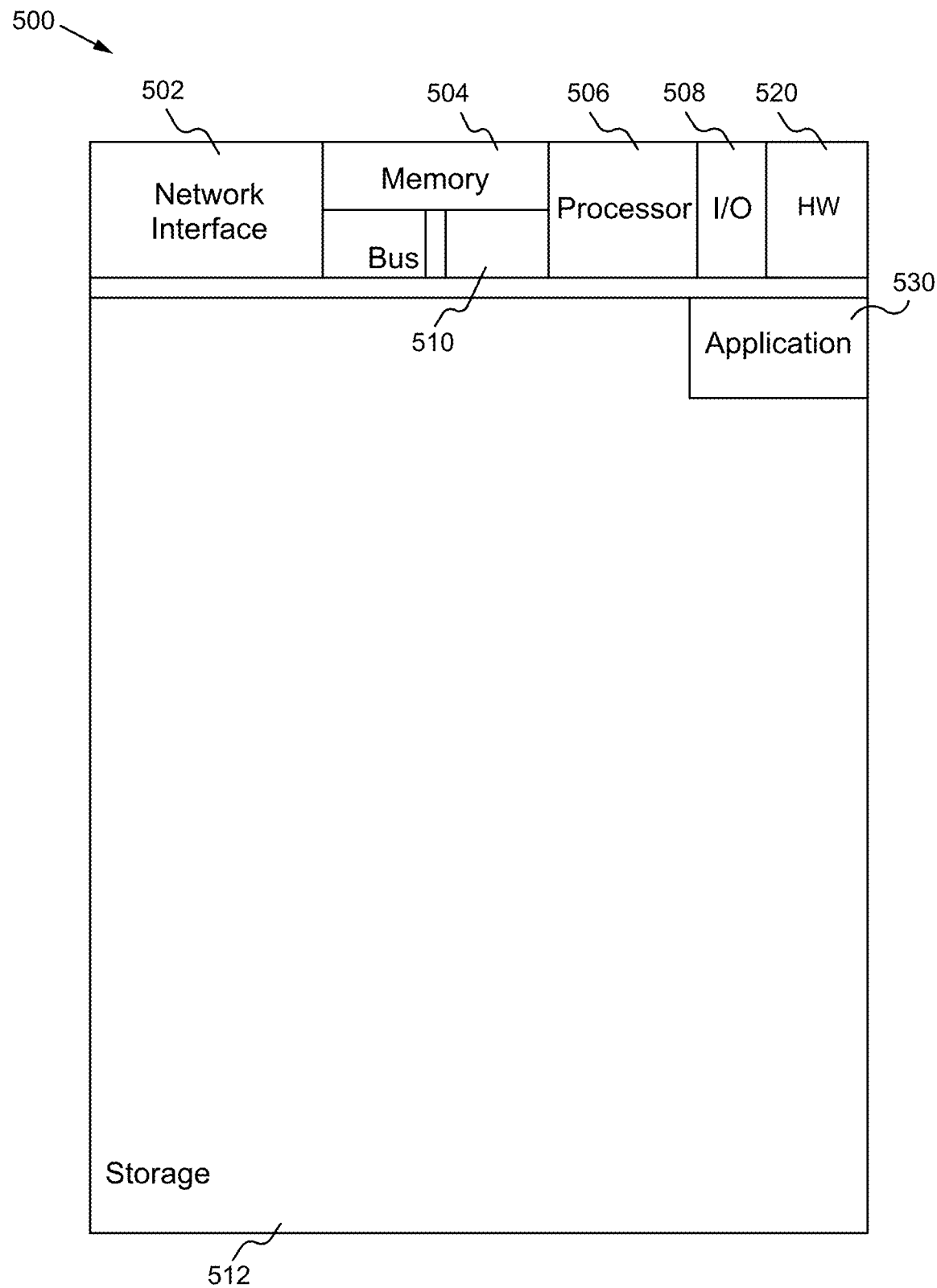
FIG. 5 illustrates a block diagram of an exemplary computing device configured to implement the unsupervised, image-based cell clustering and sorting framework according to some embodiments.

FIG. 5 shows a block diagram of an exemplary computing device configured to implement the unsupervised, image-based cell clustering and sorting framework according to some embodiments. The computing device 500 is able to be used to acquire, store, compute, process, communicate and/or display information such as images and videos. The computing device 500 is able to implement any of the unsupervised, image-based cell clustering and sorting framework aspects. In general, a hardware structure suitable for implementing the computing device 500 includes a network interface 502, a memory 504, processors 506, I/O device(s) 508, a bus 510 and a storage device 512. The choice of processor(s) is not critical as long as suitable processor(s) with sufficient speed are chosen. The processors 506 are able to include multiple Central Processing Units (CPUs). The processors 506 and/or hardware 520 are able to include one or more Graphics Processing Units (GPUs) for efficient feature extraction based on the neural network. Each GPU should be equipped with sufficient GPU memory to perform feature extraction. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Unsupervised, image-based cell clustering and sorting framework application(s) 530 used to implement the framework are likely to be stored in the storage device 512 and memory 504 and processed as applications are typically processed. More or fewer components shown in FIG. 5 are able to be included in the computing device 500. In some embodiments, unsupervised, image-based cell clustering and sorting framework hardware 520 is included. Although the computing device 500 in FIG. 5 includes applications 530 and hardware 520 for the unsupervised, image-based cell clustering and sorting framework, the unsupervised, image-based cell clustering and sorting framework is able to be implemented on a computing device in hardware, firmware, software or any combination thereof. For example, in some embodiments, the unsupervised, image-based cell clustering and sorting framework applications 530 are programmed in a memory and executed using a processor. In another example, in some embodiments, the unsupervised, image-based cell clustering and sorting framework hardware 520 is programmed hardware logic including gates specifically designed to implement the unsupervised, image-based cell clustering and sorting framework.

In some embodiments, the unsupervised, image-based cell clustering and sorting framework application(s) 530 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 6:
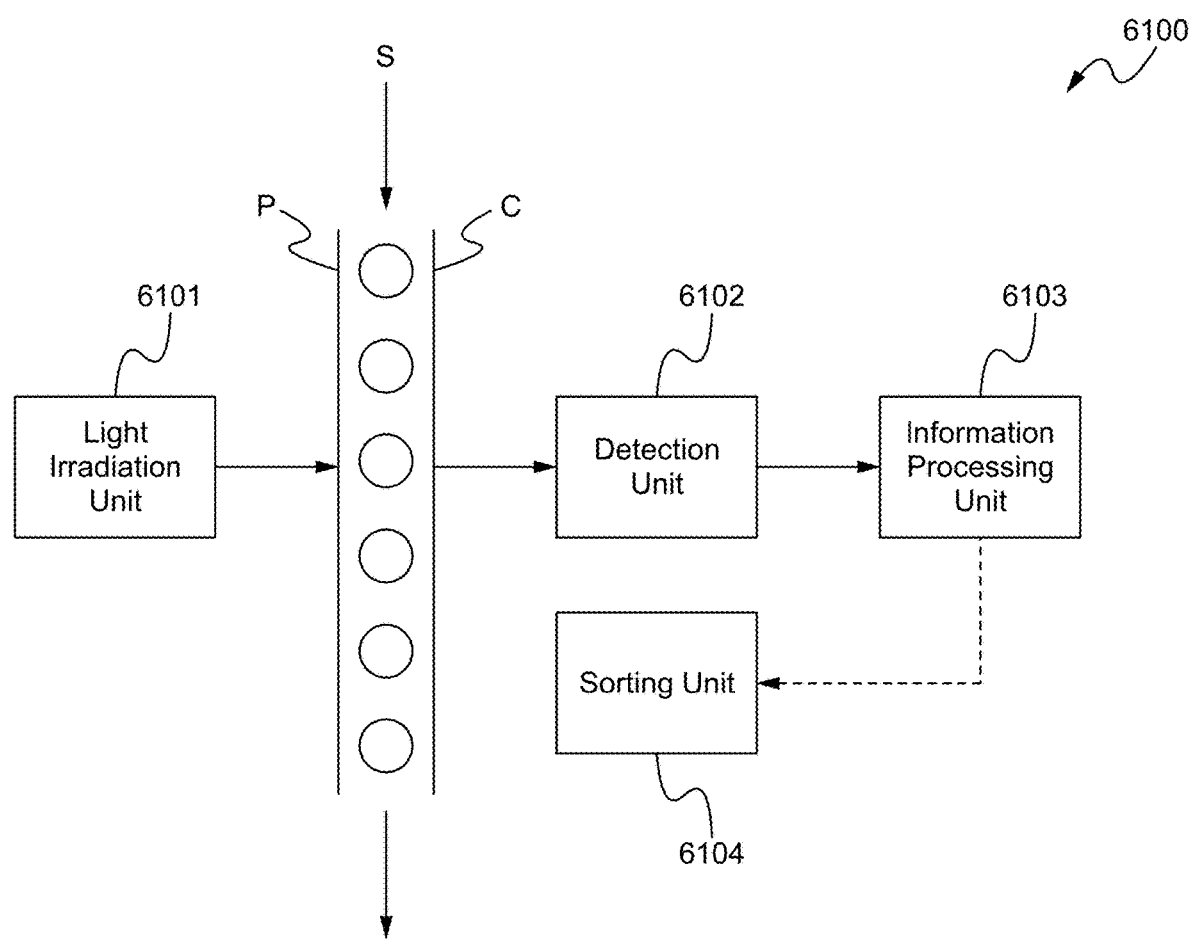
FIG. 6 illustrates a diagram schematically showing the overall configuration of a biological sample analyzer according to some embodiments.

FIG. 6 illustrates a diagram schematically showing the overall configuration of a biological sample analyzer according to some embodiments.

FIG. 6 shows an example configuration of a biological sample analyzer of the present disclosure. A biological sample analyzer 6100 shown in FIG. 6 includes: a light irradiation unit 6101 that irradiates a biological sample S flowing in a flow channel C with light; a detection unit 6102 that detects light generated by irradiating the biological sample S; and an information processing unit 6103 that processes information about the light detected by the detection unit. The biological sample analyzer 6100 is a flow cytometer or an imaging cytometer, for example. The biological sample analyzer 6100 may include a sorting unit 6104 that sorts out specific biological particles P in a biological sample. The biological sample analyzer 6100 including the sorting unit is a cell sorter, for example.

(Biological Sample)

The biological sample S may be a liquid sample containing biological particles. The biological particles are cells or non-cellular biological particles, for example. The cells may be living cells, and more specific examples thereof include blood cells such as erythrocytes and leukocytes, and germ cells such as sperms and fertilized eggs. Also, the cells may be those directly collected from a sample such as whole blood, or may be cultured cells obtained after culturing. The non-cellular biological particles are extracellular vesicles, or particularly, exosomes and microvesicles, for example. The biological particles may be labeled with one or more labeling substances (such as a dye (particularly, a fluorescent dye) and a fluorochrome-labeled antibody). Note that particles other than biological particles may be analyzed by the biological sample analyzer of the present disclosure, and beads or the like may be analyzed for calibration or the like.

(Flow Channel)

The flow channel C is designed so that a flow of the biological sample S is formed. In particular, the flow channel C may be designed so that a flow in which the biological particles contained in the biological sample are aligned substantially in one row is formed. The flow channel structure including the flow channel C may be designed so that a laminar flow is formed. In particular, the flow channel structure is designed so that a laminar flow in which the flow of the biological sample (a sample flow) is surrounded by the flow of a sheath liquid is formed. The design of the flow channel structure may be appropriately selected by a person skilled in the art, or a known one may be adopted. The flow channel C may be formed in a flow channel structure such as a microchip (a chip having a flow channel on the order of micrometers) or a flow cell. The width of the flow channel C is 1 mm or smaller, or particularly, may be not smaller than 10 μm and not greater than 1 mm. The flow channel C and the flow channel structure including the flow channel C may be made of a material such as plastic or glass.

The biological sample analyzer of the present disclosure is designed so that the biological sample flowing in the flow channel C, or particularly, the biological particles in the biological sample are irradiated with light from the light irradiation unit 6101. The biological sample analyzer of the present disclosure may be designed so that the irradiation point of light on the biological sample is located in the flow channel structure in which the flow channel C is formed, or may be designed so that the irradiation point is located outside the flow channel structure. An example of the former case may be a configuration in which the light is emitted onto the flow channel C in a microchip or a flow cell. In the latter case, the biological particles after exiting the flow channel structure (particularly, the nozzle portion thereof) may be irradiated with the light, and a flow cytometer of a jet-in-air type can be adopted, for example.

(Light Irradiation Unit)

The light irradiation unit 6101 includes a light source unit that emits light, and a light guide optical system that guides the light to the irradiation point. The light source unit includes one or more light sources. The type of the light source(s) is a laser light source or an LED, for example. The wavelength of light to be emitted from each light source may be any wavelength of ultraviolet light, visible light, and infrared light. The light guide optical system includes optical components such as beam splitters, mirrors, or optical fibers, for example. The light guide optical system may also include a lens group for condensing light, and includes an objective lens, for example. There may be one or more irradiation points at which the biological sample and light intersect. The light irradiation unit 6101 may be designed to collect light emitted onto one irradiation point from one light source or different light sources.

(Detection Unit)

The detection unit 6102 includes at least one photodetector that detects light generated by emitting light onto biological particles. The light to be detected may be fluorescence or scattered light (such as one or more of the following: forward scattered light, backscattered light, and side scattered light), for example. Each photodetector includes one or more light receiving elements, and has a light receiving element array, for example. Each photodetector may include one or more photomultiplier tubes (PMTs) and/or photodiodes such as APDs and MPPCs, as the light receiving elements. The photodetector includes a PMT array in which a plurality of PMTs is arranged in a one-dimensional direction, for example. The detection unit 6102 may also include an image sensor such as a CCD or a CMOS. With the image sensor, the detection unit 6102 can acquire an image (such as a bright-field image, a dark-field image, or a fluorescent image, for example) of biological particles.

The detection unit 6102 includes a detection optical system that causes light of a predetermined detection wavelength to reach the corresponding photodetector. The detection optical system includes a spectroscopic unit such as a prism or a diffraction grating, or a wavelength separation unit such as a dichroic mirror or an optical filter. The detection optical system is designed to disperse the light generated by light irradiation to biological particles, for example, and detect the dispersed light with a larger number of photodetectors than the number of fluorescent dyes with which the biological particles are labeled. A flow cytometer including such a detection optical system is called a spectral flow cytometer. Further, the detection optical system is designed to separate the light corresponding to the fluorescence wavelength band of a specific fluorescent dye from the light generated by the light irradiation to the biological particles, for example, and cause the corresponding photodetector to detect the separated light.

The detection unit 6102 may also include a signal processing unit that converts an electrical signal obtained by a photodetector into a digital signal. The signal processing unit may include an A/D converter as a device that performs the conversion. The digital signal obtained by the conversion performed by the signal processing unit can be transmitted to the information processing unit 6103. The digital signal can be handled as data related to light (hereinafter, also referred to as "light data") by the information processing unit 6103. The light data may be light data including fluorescence data, for example. More specifically, the light data may be data of light intensity, and the light intensity may be light intensity data of light including fluorescence (the light intensity data may include feature quantities such as area, height, and width).

(Information Processing Unit)

The information processing unit 6103 includes a processing unit that performs processing of various kinds of data (light data, for example), and a storage unit that stores various kinds of data, for example. In a case where the processing unit acquires the light data corresponding to a fluorescent dye from the detection unit 6102, the processing unit can perform fluorescence leakage correction (a compensation process) on the light intensity data. In the case of a spectral flow cytometer, the processing unit also performs a fluorescence separation process on the light data, and acquires the light intensity data corresponding to the fluorescent dye. The fluorescence separation process may be performed by an unmixing method disclosed in JP 2011-232259 A, for example. In a case where the detection unit

6102 includes an image sensor, the processing unit may acquire morphological information about the biological particles, on the basis of an image acquired by the image sensor. The storage unit may be designed to be capable of storing the acquired light data. The storage unit may be designed to be capable of further storing spectral reference data to be used in the unmixing process.

In a case where the biological sample analyzer 6100 includes the sorting unit 6104 described later, the information processing unit 6103 can determine whether to sort the biological particles, on the basis of the light data and/or the morphological information. The information processing unit 6103 then controls the sorting unit 6104 on the basis of the result of the determination, and the biological particles can be sorted by the sorting unit 6104.

The information processing unit 6103 may be designed to be capable of outputting various kinds of data (such as light data and images, for example). For example, the information processing unit 6103 can output various kinds of data (such as a two-dimensional plot or a spectrum plot, for example) generated on the basis of the light data. The information processing unit 6103 may also be designed to be capable of accepting inputs of various kinds of data, and accepts a gating process on a plot by a user, for example. The information processing unit 6103 may include an output unit (such as a display, for example) or an input unit (such as a keyboard, for example) for performing the output or the input.

The information processing unit 6103 may be designed as a general-purpose computer, and may be designed as an information processing device that includes a CPU, a RAM, and a ROM, for example. The information processing unit 6103 may be included in the housing in which the light irradiation unit 6101 and the detection unit 6102 are included, or may be located outside the housing. Further, the various processes or functions to be executed by the information processing unit 6103 may be realized by a server computer or a cloud connected via a network.

(Sorting Unit)

The sorting unit 6104 performs sorting of biological particles, in accordance with the result of determination performed by the information processing unit 6103. The sorting method may be a method by which droplets containing biological particles are generated by vibration, electric charges are applied to the droplets to be sorted, and the traveling direction of the droplets is controlled by an electrode. The sorting method may be a method for sorting by controlling the traveling direction of biological particles in the flow channel structure. The flow channel structure has a control mechanism based on pressure (injection or suction) or electric charge, for example. An example of the flow channel structure may be a chip (the chip disclosed in JP 2020-76736 A, for example) that has a flow channel structure in which the flow channel C branches into a recovery flow channel and a waste liquid flow channel on the downstream side, and specific biological particles are collected in the recovery flow channel.

To utilize the unsupervised, image-based cell clustering and sorting framework described herein, devices such as a flow cytometer with a camera are used to acquire content, and a device is able to process the acquired content. The unsupervised, image-based cell clustering and sorting framework is able to be implemented with user assistance or automatically without user involvement.

In operation, the unsupervised, image-based cell clustering and sorting framework is able to be used even if ground truth is not available, and the feature extraction based on very few neural network layers speeds up extraction for real time applications. Additionally, the unsupervised, image-based cell clustering and sorting framework allows applications to sort cells based on cell images with or without fluorescent markers.

Some Embodiments of a Framework for Image Based Unsupervised Cell Clustering and Sorting 1. A method comprising:
   performing offline initial image-based unsupervised clustering; and
   performing online image-based single cell sorting.
2. The method of clause 1 further comprising training which comprises receiving one or more cell image datasets with or without ground truth information to train a feature extractor.
3. The method of clause 2 wherein the feature extractor is based on a neural network comprising several convolutional layers.
4. The method of clause 2 wherein performing offline initial clustering for a set of cell images includes using the feature extractor to extract features of the cell images, using a small subset of the given cell images to train the cluster component, and using the cluster component to identify the clusters of the given cell images in an unsupervised manner.
5. The method of clause 2 wherein performing online image-based single cell sorting includes utilizing the feature extractor to extract features of cell images and using the cluster component for unsupervised cell sorting.
6. The method of clause 2 further comprising refining the feature extractor using additional datasets after the feature extractor has been trained.
7. The method of clause 1 wherein clustering includes utilizing hierarchical density-based spatial clustering.
8. The method of clause 7 wherein clustering separates and groups different types of cells based on the extracted features including a definition of each cluster.
9. An apparatus comprising:
   a non-transitory memory for storing an application, the application for:
      performing offline initial image-based unsupervised clustering; and
      performing online image-based single cell sorting; and
   a plurality of processing units configured for processing the application, wherein the plurality of processing units include at least one central processing unit and at least one graphics processing unit.
10. The apparatus of clause 9 wherein the application is further for training which comprises receiving one or more cell image datasets with or without ground truth information to train a feature extractor.
11. The apparatus of clause 10 wherein the feature extractor is based on a neural network comprising several convolutional layers.
12. The apparatus of clause 10 wherein performing offline initial clustering for a set of cell images includes using the feature extractor to extract features of the cell images, using a small subset of the given cell images to train the cluster component, and using the cluster component to identify the clusters of the given cell images in an unsupervised manner.
13. The apparatus of clause 10 wherein performing online image-based single cell sorting includes utilizing the feature extractor to extract features of cell images and using the cluster component for unsupervised cell sorting.

14. The apparatus of clause 10 further comprising refining the feature extractor using additional datasets after the feature extractor has been trained.

15. The apparatus of clause 9 wherein clustering includes utilizing hierarchical density-based spatial clustering.

16. The apparatus of clause 15 wherein clustering separates and groups different types of cells based on the extracted features including a definition of each cluster.

17. A system comprising:
a first computing device configured for:
performing offline image-based unsupervised clustering; and
performing online image-based single cell sorting based on the offline image-based unsupervised clustering; and
a second computing device configured for sending one or more images to the first computing device.

18. The system of clause 17 wherein the first device is configured for training which comprises receiving one or more cell image datasets with or without ground truth information to train a feature extractor.

19. The system of clause 18 wherein the feature extractor is based on a neural network comprising several convolutional layers.

20. The system of clause 18 wherein performing offline initial clustering for a set of cell images includes using the feature extractor to extract features of the cell images, using a small subset of the given cell images to train the cluster component, and using the cluster component to identify the clusters of the given cell images in an unsupervised manner.

21. The system of clause 18 wherein performing online image-based single cell sorting includes utilizing the feature extractor to extract features of cell images and using the cluster component for unsupervised cell sorting.

22. The system of clause 18 further comprising refining the feature extractor using additional datasets after the feature extractor has been trained.

23. The system of clause 17 wherein clustering includes utilizing hierarchical density-based spatial clustering.

24. The system of clause 23 wherein clustering separates and groups different types of cells based on the extracted features including a definition of each cluster.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
training a feature extractor which comprises receiving one or more cell image datasets with or without ground truth information to train the feature extractor;
performing offline initial image-based unsupervised clustering, wherein performing the offline initial image-based unsupervised clustering for a set of cell images includes using the feature extractor to extract features of the cell images, using a small subset of the given cell images to train a cluster component, and using the cluster component to identify the clusters of the given cell images in an unsupervised manner; and
performing online image-based single cell sorting, wherein performing online image-based single cell sorting includes utilizing the feature extractor to extract features of cell images and using the cluster component for unsupervised cell sorting.

2. The method of claim 1 wherein the feature extractor is based on a neural network comprising several convolutional layers.

3. The method of claim 1 further comprising refining the feature extractor using additional datasets after the feature extractor has been trained.

4. The method of claim 1 wherein clustering includes utilizing hierarchical density-based spatial clustering.

5. The method of claim 4 wherein clustering separates and groups different types of cells based on the extracted features including a definition of each cluster.

6. An apparatus comprising:
a non-transitory memory for storing an application, the application for:
training a feature extractor which comprises receiving one or more cell image datasets with or without ground truth information to train the feature extractor;
performing offline initial image-based unsupervised clustering, wherein performing the offline initial image-based unsupervised clustering for a set of cell images includes using the feature extractor to extract features of the cell images, using a small subset of the given cell images to train a cluster component, and using the cluster component to identify the clusters of the given cell images in an unsupervised manner; and
performing online image-based single cell sorting, wherein performing online image-based single cell sorting includes utilizing the feature extractor to extract features of cell images and using the cluster component for unsupervised cell sorting; and
a plurality of processing units configured for processing the application, wherein the plurality of processing units include at least one central processing unit and at least one graphics processing unit.

7. The apparatus of claim 6 wherein the feature extractor is based on a neural network comprising several convolutional layers.

8. The apparatus of claim 6 further comprising refining the feature extractor using additional datasets after the feature extractor has been trained.

9. The apparatus of claim 6 wherein clustering includes utilizing hierarchical density-based spatial clustering.

10. The apparatus of claim 9 wherein clustering separates and groups different types of cells based on the extracted features including a definition of each cluster.

11. A system comprising:
a first computing device configured for:
training a feature extractor which comprises receiving one or more cell image datasets with or without ground truth information to train the feature extractor;
performing offline initial image-based unsupervised clustering, wherein performing the offline initial image-based unsupervised clustering for a set of cell images includes using the feature extractor to extract features of the cell images, using a small subset of the given cell images to train a cluster component, and using the cluster component to identify the clusters of the given cell images in an unsupervised manner; and performing online image-based single cell sorting, wherein performing online image-based single cell sorting includes utilizing the feature extractor to extract features of cell images and using the cluster component for unsupervised cell sorting; and a second computing device configured for sending the one or more cell image datasets to the first computing device.

12. The system of claim 11 wherein the feature extractor is based on a neural network comprising several convolutional layers.

13. The system of claim 11 further comprising refining the feature extractor using additional datasets after the feature extractor has been trained.

14. The system of claim 11 wherein clustering includes utilizing hierarchical density-based spatial clustering.

15. The system of claim 14 wherein clustering separates and groups different types of cells based on the extracted features including a definition of each cluster.

\* \* \* \* \*